United States Patent
Matthews et al.

(10) Patent No.: US 10,264,426 B2
(45) Date of Patent: Apr. 16, 2019

(54) SYSTEM AND METHOD FOR FACILITATING CARRIER-SPECIFIC CONFIGURATION OF A USER DEVICE BASED ON PRE-STORED INFORMATION FOR MULTIPLE CARRIERS

(71) Applicant: APKUDO, LLC, Baltimore, MD (US)

(72) Inventors: Joshua Scott Matthews, Baltimore, MD (US); Ben Leslie, Enmore (AU); Melissa Blanken, Kensington, MD (US)

(73) Assignee: APKUDO, LLC, Baltimore, MD (US)

( * ) Notice: Subject to any disclaimer, the term of this patent is extended or adjusted under 35 U.S.C. 154(b) by 0 days.

(21) Appl. No.: 15/895,176

(22) Filed: Feb. 13, 2018

(65) Prior Publication Data

US 2018/0176752 A1    Jun. 21, 2018

Related U.S. Application Data

(62) Division of application No. 15/173,528, filed on Jun. 3, 2016, now Pat. No. 9,936,331.

(51) Int. Cl.
*H04W 48/04* (2009.01)
*H04W 8/28* (2009.01)
(Continued)

(52) U.S. Cl.
CPC .......... *H04W 4/50* (2018.02); *H04W 8/245* (2013.01); *H04W 8/265* (2013.01); *H04W 48/04* (2013.01); *H04W 48/18* (2013.01)

(58) Field of Classification Search
CPC ..... H04W 48/00–48/20; H04W 12/06; H04W 4/24; H04W 4/001; H04W 12/08; H04W 88/06; H04W 8/18; H04W 12/00
(Continued)

(56) References Cited

U.S. PATENT DOCUMENTS

| | | |
|---|---|---|
| 6,134,435 A | 10/2000 | Zicker et al. |
| 8,442,521 B2 | 5/2013 | Fleischman et al. |

(Continued)

OTHER PUBLICATIONS

International Search Report PCT/US17/35294 dated Aug. 24, 2017.
(Continued)

*Primary Examiner* — Allahyar Kasraian
(74) *Attorney, Agent, or Firm* — Pillsbury Winthrop Shaw Pittman LLP

(57) ABSTRACT

In certain embodiments, carrier-specific configuration of a user device may be facilitated based on pre-stored information for multiple carriers. In some embodiments, a user device may store information for limited access (that allows the user device to obtain carrier-specific parameters from carrier networks). During activation, the user device may select one of the carrier networks on which the user device is to be configured to operate. Responsive to the selection, the user device may provide, to a carrier-side computer system on the selected carrier network, a request for limited access to the selected carrier network for configuring the user device, wherein the request comprises the stored access information that allows the user device to obtain carrier-specific parameters via the selected carrier network. Responsive to the limited access being granted, the user device may obtain a configuration package from the carrier-side computer system comprising parameters for configuring the user device.

18 Claims, 9 Drawing Sheets

(51) Int. Cl.
*H04W 4/50* (2018.01)
*H04W 8/26* (2009.01)
*H04W 48/18* (2009.01)
*H04W 8/24* (2009.01)

(58) Field of Classification Search
USPC ... 455/405–408, 418, 419, 435.1–435.3, 445
See application file for complete search history.

(56) References Cited

U.S. PATENT DOCUMENTS

| | | |
|---|---|---|
| 2005/0005105 A1 | 1/2005 | Brown et al. |
| 2007/0082655 A1 | 4/2007 | Link, II et al. |
| 2009/0181662 A1 | 7/2009 | Fleischman et al. |
| 2012/0003973 A1 | 1/2012 | Tseng |
| 2012/0113865 A1 | 5/2012 | Zhao |
| 2013/0303114 A1 | 11/2013 | Ahmad |
| 2014/0228042 A1 | 8/2014 | Annan |
| 2015/0312699 A1 | 10/2015 | Rodgers et al. |
| 2015/0382286 A1 | 12/2015 | Daoud |
| 2016/0049975 A1* | 2/2016 | Uy ................ H04B 1/3816 455/558 |
| 2016/0198292 A1 | 7/2016 | Sponza |

OTHER PUBLICATIONS

Written Opinion of the International Searching Authority PCT/US17/35294 dated Aug. 24, 2017.
Non-Final Office Action U.S. Appl. No. 15/173,528 dated Jun. 1, 2017.
Notice of Allowance U.S. Appl. No. 15/173,528 dated Dec. 4, 2017.

* cited by examiner

SYSTEM AND METHOD FOR FACILITATING CARRIER-SPECIFIC CONFIGURATION OF A USER DEVICE BASED ON PRE-STORED INFORMATION FOR MULTIPLE CARRIERS

CROSS-REFERENCE TO RELATED APPLICATIONS

This Application is a Divisional Application of U.S. Ser. No. 15/173,528, filed Jun. 3, 2016, the subject matter of which is incorporated herein by reference in entirety.

FIELD OF THE INVENTION

The invention relates to carrier-specific configuration of a user device and, more particularly, to carrier-specific configuration of a user device based on pre-stored information for multiple carriers.

BACKGROUND OF THE INVENTION

Traditionally, mobile devices, such as smartphones or other mobile devices, providing telecommunication services (e.g., voice, text, data, etc.) are configured for a single telecommunication carrier. Prior to activation of a mobile device, for instance, the mobile device may be configured for a particular carrier by a manufacturer such that the hardware and software are only compatible with a carrier network of the particular carrier. Although existing solutions may enable a mobile device to be configured during activation of the mobile device, typical solutions may require the mobile device to connect with a third-party local area network and directly obtain the necessary configurations from the third-party local area network in order for the mobile device to compatibly operate on a selected carrier network.

SUMMARY OF THE INVENTION

Aspects of the invention relate to methods, apparatuses, and/or systems for facilitating carrier-specific configuration of a user device. In one or more embodiments, carrier-specific configuration of a user device may be facilitated using information pre-stored at the user device, such as information pre-stored on the user device during the manufacturing processing, prior to delivery of the user device to a carrier, prior to delivery of the user device to a user, etc. As an example, the pre-stored information may comprise information for limited access that allows the user device to obtain carrier-specific parameters for configuring the user device from respective carrier networks, configuration packages comprising sets of carrier-specific parameters for configuring the user device for respective carrier networks, or other pre-stored information.

In certain embodiments, a user device may store information for limited access that allows the user device to obtain carrier-specific parameters for configuring the user device from carrier networks of different carriers. The limited access information may comprise access information that allows the user device to obtain carrier-specific parameters for configuring the user device via a carrier network of one carrier, access information that allows the user device to obtain carrier-specific parameters for configuring the user device via a carrier network of another carrier, and so on. The user device may select, during activation of the user device, one of the carrier networks on which the user device is to be configured to operate. Responsive to the selection of the carrier network, the user device may provide, to a carrier-side computer system on the selected carrier network, a request for limited access to the selected carrier network for configuring the user device for the selected carrier network. The limited access request comprises at least some of the stored access information that allows the user device to obtain carrier-specific parameters for configuring the user device via the selected carrier network. Responsive to the limited access being granted by the carrier-side computer system, the user device may obtain, from the carrier-side computer system, a configuration package comprising one or more carrier-specific parameters for configuring the user device for the selected carrier network. The user device may cause, based on the obtained configuration package, the user device to be configured for further access to the selected carrier network.

In some embodiments, a user device may store configuration packages comprising sets of carrier-specific parameters for configuring the user device for carrier networks of different carriers. The sets of carrier-specific parameters may comprise a set of carrier-specific parameters of one configuration package for configuring the user device for a carrier network of one carrier, a set of carrier-specific parameters of another configuration package for configuring the user device for a carrier network of another carrier, and so on. The user device may select, during activation of the user device, one of the carrier networks on which the user device is to be configured to operate. Responsive to the selection of the carrier network, the user device may obtain a configuration package of the stored configuration packages that comprises one or more carrier-specific parameters for configuring the user device for the selected carrier network. The user device may cause, based on the obtained configuration package, the user device to be configured for further access to the selected carrier network.

In certain embodiments, a carrier-side computer system may obtain, from a user device during activation of the user device, a request for limited access to a carrier network of the carrier for configuring the user device for the carrier network. The limited access request may comprise access information that allows the user device to obtain carrier-specific parameters for configuring the user device via the carrier network. The carrier-side computer system may cause, based on the access information, the limited access to be granted for configuring the user device. The carrier-side computer system may obtain, from the user device during the activation of the user device, a configuration request comprising at least one of an identifier for the user device or an identifier for a smart card in the user device. Responsive to the limited access being granted, the carrier-side computer system may process at least one of the identifier of the user device or the identifier of the smart card to obtain a configuration package comprising one or more carrier-specific parameters for configuring the user device for the carrier network. The carrier-side computer system may provide the obtained configuration package to the user device. The user device may be configured to operate on the carrier network based on the carrier-specific parameters of the configuration package.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
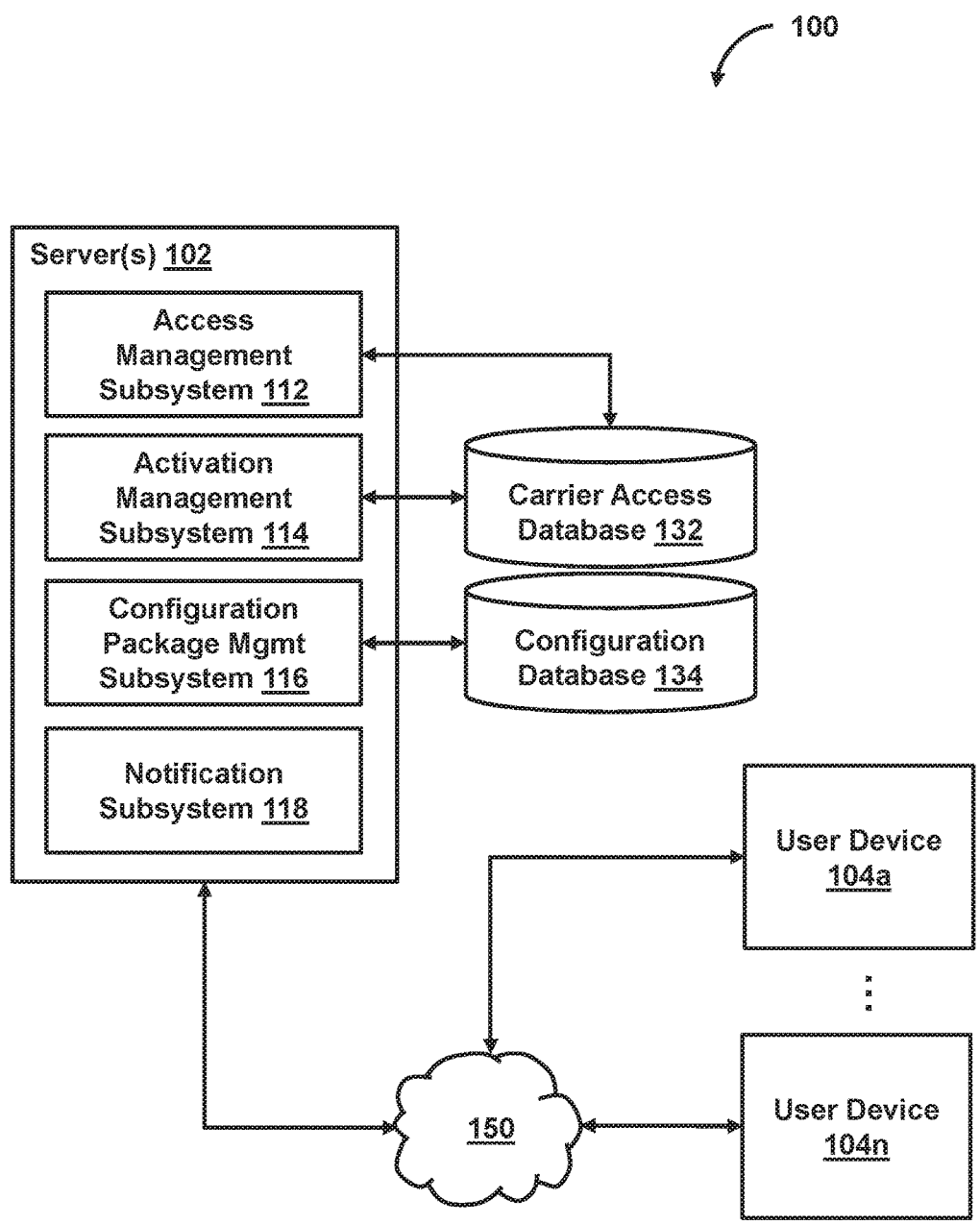
FIG. 1 shows a system for facilitating carrier-specific configuration of a user device, in accordance with one or more embodiments.

FIG. 1 shows a system 100 for facilitating carrier-specific configuration of a user device, in accordance with one or more embodiments. As shown in FIG. 1, system 100 may comprise server 102 (or multiple servers 102). Server 102 may comprise assessment management subsystem 112, activation management subsystem 114, configuration package management subsystem 116, notification subsystem 118, or other components.

System 100 may further comprise user device 104 (or multiple user devices 104a-104n). User device 104 may comprise any type of mobile terminal, fixed terminal, or other device. By way of example, user device 104 may comprise a desktop computer, a notebook computer, a tablet computer, a smartphone, a wearable device, or other user device. Users may, for instance, utilize one or more user devices 104 to interact with server 102 or other components of system 100. It should be noted that, while one or more operations are described herein as being performed by components of server 102, those operations may, in some embodiments, be performed by components of user device 104 or other components of system 100.

Figure 2:
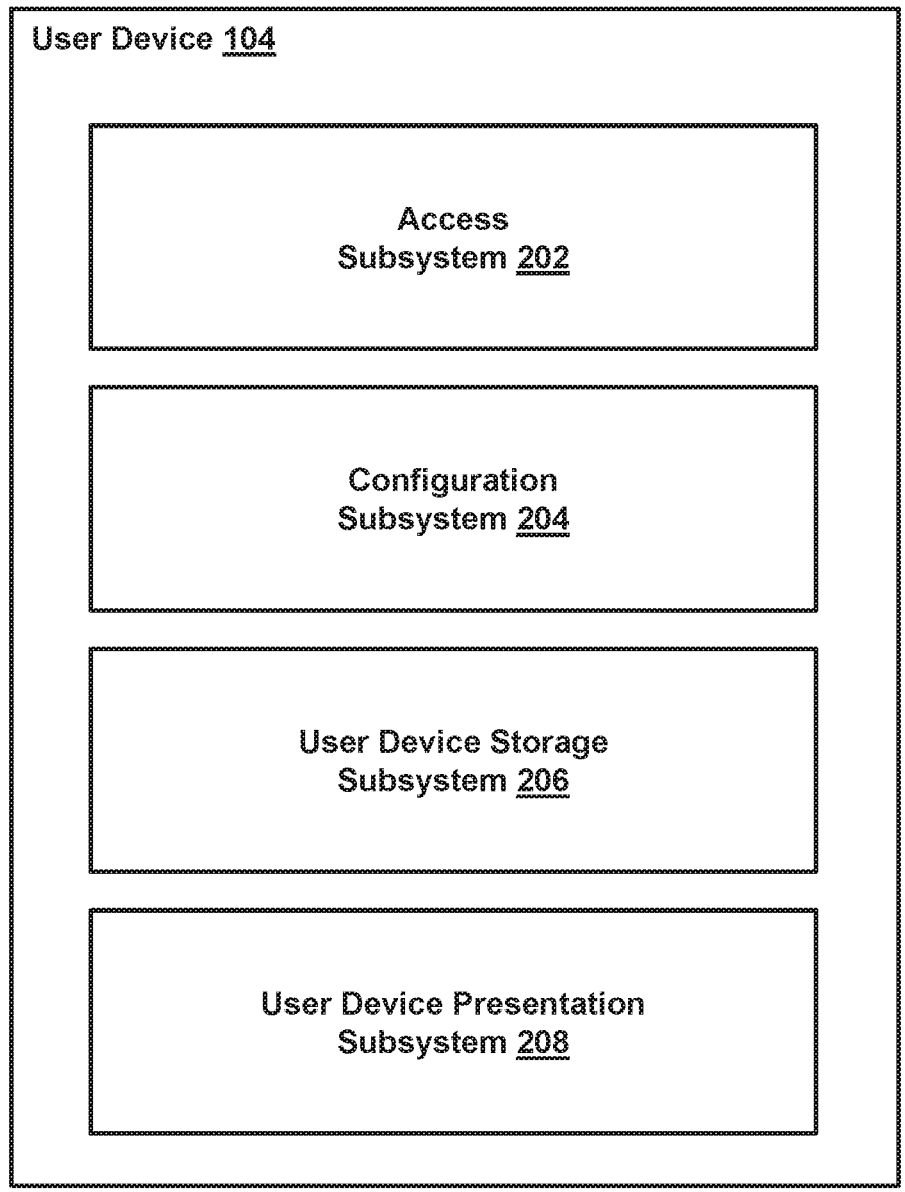
FIG. 2 shows a user device for facilitating carrier-specific configuration, in accordance with one or more embodiments.

As shown in FIG. 2, in an embodiment, user device 104 may comprise an access subsystem 202, a configuration subsystem 204, a user device storage subsystem 206, a user device presentation subsystem 208, or other components. It should also be noted that, while one or more operations are described herein as being performed by components of user device 104, those operations may, in some embodiments, be performed by components of server 102 or other components of system 100.

Carrier-Specific Configuration Via a Carrier-Side Computer System

In some embodiments, carrier-specific configuration of a user device may be facilitated using information pre-stored at the user device, such as information pre-stored on the user device during the manufacturing processing, prior to delivery of the user device to a carrier, prior to delivery of the user device to a user, etc. As an example, the pre-stored information may comprise information for limited access that allows the user device to obtain carrier-specific parameters for configuring the user device from respective carrier networks (e.g., cellular networks of respective carriers or other carrier networks), configuration packages comprising sets of carrier-specific parameters for configuring the user device for respective carrier networks, or other pre-stored information.

In an embodiment, with respect to FIG. 1, access management subsystem 112 (of a carrier) may obtain a request for limited access to a carrier network of the carrier for configuring a user device (e.g., configuring the user device for the carrier network). As an example, access management subsystem 112 may obtain the limited access request from the user device during activation of the user device or other period. The limited access request may comprise access information that allows the user device to obtain carrier-specific parameters for configuring the user device via the carrier network. The limited access information (in the request) may comprise an identifier for the user device, an identifier for a smart card in the user device, a network identifier (e.g., an Access Point Name (APN) or other identifier) for an access point (on the carrier network) via which the user device can obtain configuration information (e.g., a dedicated access point on the carrier network for allowing user devices to obtain configuration information or other access point), or other information. Additionally, or alternatively, the limited access information may comprise a username, a password (also referred to as passphrase, passcode, passkey, etc.), an access token, or other information. In an embodiment, the limited access request may be generated at the user device based on pre-stored information on the user device, such as the network identifier for the access point (on the carrier network for obtaining configuration information), a network address associated with such access point, or other pre-stored information (e.g., an identifier associated with the user device or a user of the user device, an authentication key that validates the associated identifier, etc.). In an embodiment, the pre-stored information on the user device may include an APN that is recognized by multiple carrier networks of multiple carriers (e.g., apn.carrierpack.org or other APN) and allows the user device limited access for obtaining carrier-specific parameters via any of the multiple carrier networks (e.g., T-MOBILE network, VERIZON WIRELESS network, AT&T WIRELESS network, etc.). The limited access request may be generated at the user device to include the APN recognized by the multiple carrier networks. In an embodiment, the pre-stored information on the user device may include a first APN that is recognized by a first set of carrier networks of multiple carriers and allows the user device limited access for obtaining carrier-specific parameters via any of the carrier networks of the first set, a second APN that is recognized by a second set of carrier networks of multiple carriers and allows the user device limited access for obtaining carrier-specific parameters via any of the carrier networks of the second set, and so on. The limited access request may be generated at the user device to include one or more of the APNs recognized by the respective set of carrier networks.

Responsive to obtaining the limited access request, access management subsystem 112 may process the limited access information to verify that the user device is authorized for at least limited access (for configuring the user device). Upon verification, access management subsystem 112 may cause the limited access to be granted for configuring the user device for the carrier network. As an example, if the limited access request comprises an identifier for the user device and an identifier for a smart card in the user device, access management subsystem 112 may check the user device identifier and the smart card identifier against identifiers in carrier access database 132. If corresponding identifiers exist in carrier access database 132 (e.g., matching user device and smart card identifiers are found), access management subsystem 112 may grant the limited access for configuring the user device for the carrier network.

In an embodiment, activation management subsystem 114 may obtain a configuration request from the user device (e.g., during the activation of the user device or other period). The configuration request may comprise an identifier for the user device, an identifier for a smart card in the user device, information indicating a location associated with the user device, or other information. In an embodiment, activation management subsystem 114 may obtain the configuration request from the user device responsive to limited access (for configuring the user device) being granted. In one use case, activation management subsystem 114 may process the user device identifier, the smart card identifier, the location information, or other information in the configuration request to obtain a configuration package for the user device. The obtained configuration package may comprise one or more carrier-specific parameters for configuring the user device for the carrier network. As an example, the carrier-specific parameters may comprise one or more APNs (e.g., names of access points, structures that each include a network identifier, an operator identifier, etc., or other APNs), network indicator icons, default roaming settings, HTTP and RTSP Proxy settings, boot animations and/or sounds, applications and/or default application settings, wallpapers, default phone contacts, default browser homepage, or other carrier-specific parameters.

Configuration package management subsystem 116 may obtain the configuration package, and provide the configuration package to the user device. Based on the carrier-specific parameters of the configuration package, the user device may be configured to operate on the carrier network. As an example, responsive to activation management subsystem 114 authorizing the user device for configuration (e.g., upon verifying the user device identifier, the smart card identifier, or other information in the user device's configuration request), configuration package management subsystem 116 may utilize the user device identifier and/or the smart card identifier to obtain the configuration package from configuration database 134. In one use case, for instance, the user device identifier may be associated with a particular type of user device (e.g., manufacturer, user device model, etc.), and the smart card identifier may be associated with one or more supported carriers, locations associated with the user device, etc. Configuration packages stored in configuration database 134 may each be associated with one or more types of user device, supported carriers, locations, or other attributes. In this way, the user device identifier and the smart card identifier may be utilized to query configuration database 134 to obtain a configuration package that is also associated with a user device type, a supported carrier, a location, or other attribute associated with the user device identifier and/or the smart card identifier.

In another use case, where the configuration request comprises a location associated with user device 104, configuration package management subsystem 116 may utilize the associated location (e.g., as a parameter of a query to configuration database 134) to obtain the configuration package based on the obtained configuration package being related to the associated location. As an example, a user device purchased in Baltimore, Md., USA may be pre-loaded with a Baltimore-based newspaper app, while a user device purchased in Seattle, Wash., USA may be pre-loaded with a Seattle-based newspaper app. As such, a configuration package associated with the Baltimore location may be more appropriate for the Baltimore-purchased user device (e.g., because the Baltimore-associated configuration package may comprise parameters specific to the Baltimore-based newspaper app or other Baltimore-related application). Additionally, or alternatively, a configuration package associated with the Seattle location may be more appropriate for the Seattle-purchased user device (e.g., because the Seattle-associated configuration package may comprise parameters specific to the Seattle-based newspaper app or other Seattle-related application).

Carrier-Specific Configuration at a User Device

In an embodiment, with respect to FIG. 2, user device storage subsystem 208 may store information for limited access that allows user device 104 to obtain carrier-specific parameters for configuring user device 104 from carrier networks of different carriers. In one use case, the limited access information may be pre-stored on user device 104 by a manufacturer (e.g., during the manufacturing processing, prior to delivery of user device 104 to a carrier, prior to delivery of user device 104 to a user, etc.). The limited access information may comprise access information that allows user device 104 to obtain carrier-specific parameters for configuring user device 104 via a carrier network of one carrier, access information that allows user device 104 to obtain carrier-specific parameters for configuring user device 104 via a carrier network of another carrier, and so on (e.g., access information that allows user device 104 to obtain carrier-specific parameters for configuring user device 104 via a carrier network of a third carrier and/or other access information). In an embodiment, the limited access information may comprise an APN that is recognized by multiple carrier networks of multiple carriers (e.g., apn. carrierpack.org or other APN) and allows the user device limited access for obtaining carrier-specific parameters via any of the multiple carrier networks (e.g., T-MOBILE network, VERIZON WIRELESS network, AT&T WIRELESS network, etc.). In an embodiment, the limited access information may comprise a first APN that is recognized by a first set of carrier networks of multiple carriers and allows the user device limited access for obtaining carrier-specific parameters via any of the carrier networks of the first set, a second APN that is recognized by a second set of carrier networks of multiple carriers and allows the user device limited access for obtaining carrier-specific parameters via any of the carrier networks of the second set, and so on.

As an example, the limited access information may be pre-stored on an internal persistent storage of user device 104 other than on a removable smart card in user device 104 (e.g., SIM card or other smart card). In this way, for instance, configuration subsystem 204 may obtain one or more carrier-specific parameters from a carrier network (for configuring user device 104 for operation on the carrier network) using the limited access information without necessarily requiring the smart card itself to include such limited access information. Additionally, or alternatively, different smart cards for different carriers (e.g., carriers associated with the carrier networks to which the limited access information allows user device 104 have limited access) may be utilized with user device 104 without relying on the utilized smart card(s) to each store such limited access information.

As another example, the limited access information may be pre-stored on a removable smart card in user device 104. In one use case, for instance, a smart card may comprise limited access information which, when the smart card is installed in user device 104, allows configuration subsystem 204 to gain limited access to multiple carrier network to obtain carrier-specific parameters (for configuring user device 104) from those carrier networks.

In an embodiment, configuration subsystem 204 may select one of the carrier networks on which user device 104 is to be configured to operate. As an example, configuration subsystem 204 may select one of the carrier networks during activation of user device 104 based on user input indicating the selection, a pre-programmed selection, or other input.

In an embodiment, access subsystem 202 may provide, to a carrier-side computer system (e.g., server(s) 102) on a carrier network, a request for limited access to the carrier network for configuring user device 104 for the carrier network. As an example, access subsystem 202 may provide the limited access request to the carrier-side computer system responsive to selection of the carrier network (on which the carrier-side computer system resides) as the carrier network on which user device 104 is to be configured to operate. The limited access request may comprise access information (pre-stored at user device 104) that allows user device 104 to obtain carrier-specific parameters for configuring user device 104 via the selected carrier network.

In one scenario, limited access information stored at user device 104 may allow user device 104 to be configured for access to carrier networks for the purpose of obtaining configuration information from those carrier networks. For example, when one of the carrier networks is selected as the carrier network for which user device 104 is to be configured, user device may be specifically configured using the limited access information (e.g., at least a portion thereof that comprise the carrier-specific parameters for the selected carrier network) to connect and obtain configuration information (e.g., a configuration package comprising carrier-specific parameters for configuring user device 104 for further access to the selected carrier network) from one or more access points on the selected carrier network. In this way, for example, user device 104 may obtain the configuration package via the selected carrier network (e.g., from a carrier-side computer system on the carrier network) without having to rely on a third-party local area network access point to enable access to the carrier network for configuring user device 104.

In a further scenario, the limited access information may comprise a network identifier or address (e.g., dedicated for user devices to obtain configuration information), an identifier associated with user device 104 or a user thereof (e.g., an identifier of user device 104, an identifier of a smartcard in user device 104, etc.), an authentication key (e.g., that validates the associated identifier), or other information. Access subsystem 202 of user device 104 may utilize the network identifier or address may be utilized to specify the destination of the limited access request (e.g., to specify an access point on the selected carrier network as the destination). The authentication key stored at user device 104 may correspond to an authentication key stored at a carrier-side database on the selected carrier network, and access subsystem 202 may generate the limited access request to include the associated identifier and provide the limited access request to a destination on the selected carrier network via the stored network identifier or address. Upon receipt of the limited access request at the carrier-side, for example, access management subsystem 112 may utilized the associated identifier to look up the corresponding authentication key stored at the carrier-side and then cause a randomly generated number A to be signed with the corresponding authentication key to create a new number B. Access management subsystem 112 may provide the random number A to user device 104, and access subsystem 204 of user device 104 may cause the random number A to be signed with the authentication key stored at user device 104 to generate a new number C and relay back the number C. If the number C (generated at user device 104) matches the number B (generated at the carrier-side), access management subsystem 112 may grant the limited access requested by user device 104.

In an embodiment, configuration subsystem 204 may obtain, from the carrier-side computer system, a configuration package comprising one or more carrier-specific parameters for configuring user device 104 for the carrier network. As an example, configuration subsystem 204 may obtain the configuration package from the carrier-side computer system responsive to limited access (for configuring user device 104) being granted by the carrier-side computer system. Based on the obtained configuration package, configuration subsystem 204 may cause user device 104 to be configured for further access to the carrier network. In one use case, for instance, configuration subsystem 204 may install the configuration package to configure user device 104 with the appropriate APNs, proxy settings, roaming settings (e.g., default roaming settings), or other carrier-specific parameters for the carrier network.

In an embodiment, where limited access information (which allows user device 104 to obtain configuration information from carrier networks) is stored at user device 104, at least some of the limited access information may be deleted from user device 104 after configuring user device for a selected carrier network (e.g., during post-configuration "clean-up"). In an embodiment, configuration subsystem 204 may cause at least part of the limited access information (that allows user device 104 to obtain carrier-specific parameters for configuring user device 104 via one or more carrier networks other than the selected carrier network) to be deleted from user device 104 responsive to configuring user device 104 for further access to the selected carrier network. Additionally, or alternatively, configuration subsystem 204 may cause at least part of the limited access information (that allows user device 104 to obtain carrier-specific parameters for configuring user device 104 via the selected carrier network) to be deleted from user device 104 responsive to configuring user device 104 for further access to the selected carrier network.

In an embodiment, user device storage subsystem 206 may store configuration packages comprising sets of carrier-specific parameters for configuring user device 104 for carrier networks of different carriers. In one scenario, the configuration packages may be pre-stored on user device 104 by a manufacturer (e.g., during the manufacturing processing, prior to delivery of user device 104 to a carrier, prior to delivery of user device 104 to a user, etc.). The sets of carrier-specific parameters may comprise a set of carrier-specific parameters of one configuration package for configuring the user device for a carrier network of one carrier, a set of carrier-specific parameters of another configuration package for configuring the user device for a carrier network of another carrier, and so on (e.g., a set of carrier-specific parameters of a configuration package for configuring user device 104 for a carrier network of a third carrier and/or other set of carrier-specific parameters).

In an embodiment, responsive to selection of a carrier network (e.g., from a plurality of carrier networks) as the carrier network on which user device 104 is to be configured to operate, configuration subsystem 204 may obtain, from the configuration packages stored at user device 104, a configuration package of the stored configuration packages that comprises one or more carrier-specific parameters for configuring the user device for the selected carrier network. Configuration subsystem 204 may then cause user device 104 to be configured for further access to the selected carrier network based on the obtained configuration package. In one use case, for instance, configuration subsystem 204 may install the configuration package to configure user device 104 with the appropriate APNs, proxy settings, roaming settings (e.g., default roaming settings), or other carrier-specific parameters for the selected carrier network.

As example, the configuration packages may be pre-stored on an internal persistent storage of user device 104 other than on a removable smart card in user device 104 (e.g., SIM card or other smart card). In this way, for instance, configuration subsystem 204 may configure user device 104 for operation on one or more carrier networks using the respective pre-stored configuration packages (e.g., via installation of one of the pre-stored configuration packages) without necessarily requiring the smart card itself to include such configuration packages. Additionally, or alternatively, different smart cards for different carriers (e.g., carriers associated with the carrier networks on which user device 104 may be configured to operate using the pre-stored configuration packages) may be utilized with user device 104 without relying on the utilized smart card(s) to each store such configuration packages.

As another example, the configuration packages may be pre-stored on a removable smart card in user device 104. In one use case, for instance, a smart card may comprise multiple configuration packages which, when the smart card is installed in user device 104, allows configuration subsystem 204 to configure user device 104 for a carrier network (to which at least one of the pre-stored configuration packages correspond) (e.g., by installing the respective pre-stored configuration package).

In an embodiment, responsive to selection of a carrier network (as the carrier network on which user device 104 is to be configured to operate), configuration subsystem 204 may determine whether the configuration packages (stored at user device 104) comprises a set of carrier-specific parameters for configuring user device 104 for the selected carrier network. As an example, responsive to the stored configuration packages comprising a set of carrier-specific parameters for configuring user device 104 for the selected carrier network, configuration subsystem 204 may obtain the configuration package comprising the set of carrier-specific parameters, and install the obtained configuration package on user device 104 to configure user device 104 for the selected carrier network.

As another example, however, responsive to the stored configuration packages not comprising a set of carrier-specific parameters for configuring the user device for the selected carrier network, configuration subsystem 204 may attempt to obtain a configuration package comprising such a set of carrier-specific parameters from a carrier-side computer system or other source. In one use case, for instance, if limited access information (that allows user device 104 to obtain carrier-specific parameters for configuring user device 104 via the selected carrier network) is stored at user device 104, access subsystem 202 may utilize the limited access information to generate a request for the limited access to the selected carrier network to the carrier-side computer system on the selected carrier network. Responsive to the limited access being granted, configuration subsystem 204 may obtain a configuration package comprising one or more carrier-specific parameters (for configuring user device 104 for the selected carrier network) from the carrier-side computer system.

In an embodiment, configuration subsystem 204 may provide a configuration request to a carrier-side computer system (e.g., of a selected carrier network) during activation of user device 104 or other period. The configuration request may comprise an identifier for the user device, an identifier for a smart card in the user device, information indicating a location associated with user device, or other information. As an example, where the configuration request comprises a location associated with user device 104, a configuration package obtained from the carrier-side computer system may be related to the associated location. In one use case, for instance, a user device purchased in Baltimore, Md., USA may be pre-loaded with a Baltimore-based newspaper app, while a user device purchased in Seattle, Wash., USA may be pre-loaded with a Seattle-based newspaper app. As such, a configuration package associated with the Baltimore location may be more appropriate for the Baltimore-purchased user device (e.g., because the Baltimore-associated configuration package may comprise parameters specific to the Baltimore-based newspaper app or other Baltimore-related application). Additionally, or alternatively, a configuration package associated with the Seattle location may be more appropriate for the Seattle-purchased user device (e.g., because the Seattle-associated configuration package may comprise parameters specific to the Seattle-based newspaper app or other Seattle-related application).

In an embodiment, a configuration package obtained from a carrier-side computer system may comprise one or more carrier-specific parameters associated with one location, carrier-specific parameters associated with another location, and so on (e.g., carrier-specific parameters associated with a third location or other carrier-specific parameters). In an embodiment, configuration subsystem 204 may select one or more carrier-specific parameters (of the obtained configuration package) to be applied to configure user device 104 based on a location associated with user device 104, and cause user device 104 to be configured using the selected carrier-specific parameters. As an example, the selected carrier-specific parameters may be associated with the location (associated with user device 104).

In an embodiment, a configuration package obtained from a carrier-side computer system may comprise one or more subsets that are supported by user device 104 and subsets that are not supported by user device 104. In an embodiment, configuration subsystem 204 may select one or more subsets (of the obtained configuration package) that are supported by the user device to be used to configure the user device. Responsive to the selection of the configuration package subsets, configuration subsystem 204 may cause user device 204 to be configured using the selected configuration package subsets such that subsets of the obtained configuration package that are not supported by the user device are not used to configure the user device.

Examples Flowcharts

FIGS. 3-6 comprise example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 3:
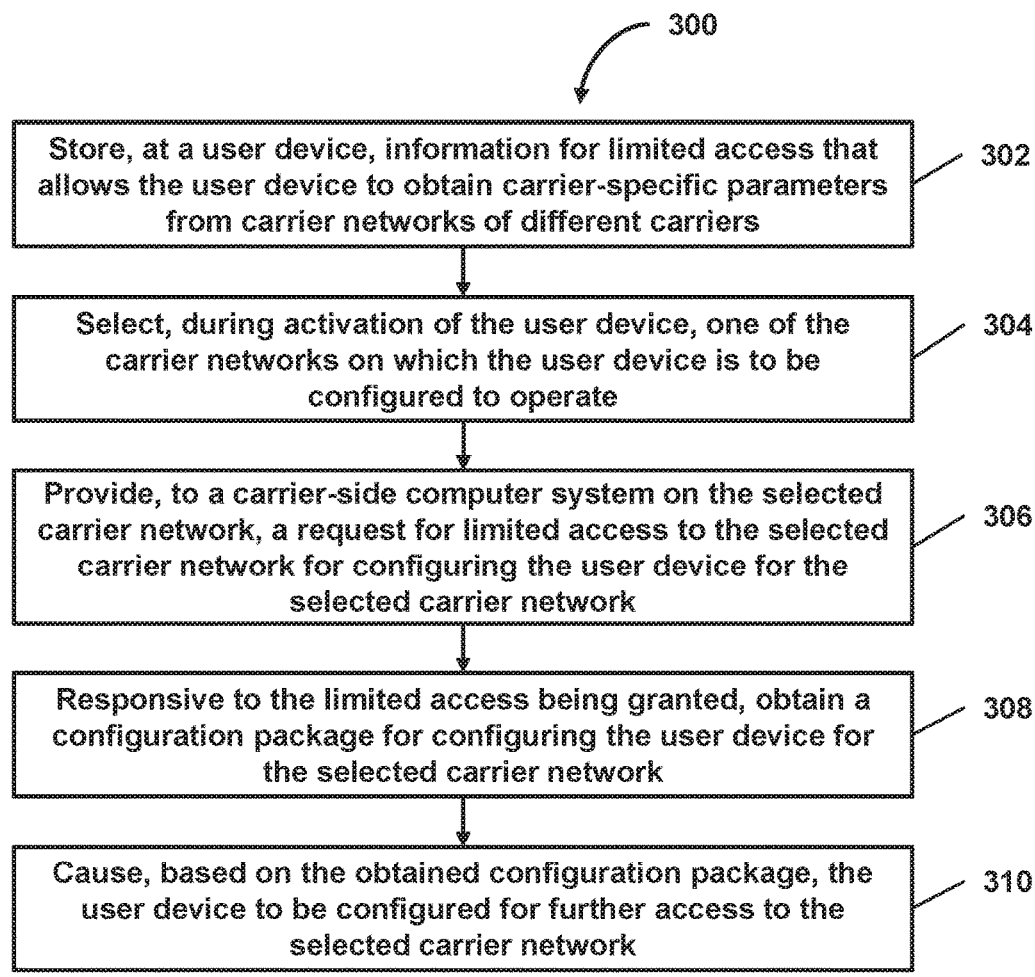
FIG. 3 shows a flowchart of a method of facilitating carrier-specific configuration of a user device based on pre-stored limited access information for multiple carriers, in accordance with one or more embodiments.

FIG. 3 shows a flowchart of a method 300 of facilitating carrier-specific configuration of a user device based on pre-stored limited access information for multiple carriers, in accordance with one or more embodiments.

In an operation 302, information for limited access (that allows the user device to obtain carrier-specific parameters for configuring the user device from carrier networks of different carriers) may be stored. As an example, the limited access information may comprise access information that allows the user device to obtain carrier-specific parameters for configuring the user device via a carrier network of a first carrier, access information that allows the user device to obtain carrier-specific parameters for configuring the user device via a carrier network of a second carrier, and so on. Operation 302 may be performed by a storage subsystem that is the same as or similar to storage subsystem 206, in accordance with one or more embodiments.

In an operation 304, one of the carrier networks on which the user device is to be configured to operate may be selected during activation of the user device. Operation 304 may be performed by a configuration subsystem that is the same as or similar to configuration subsystem 204, in accordance with one or more embodiments.

In an operation 306, a request for limited access to the selected carrier network (for configuring the user device for the selected carrier network) may be provided to a carrier-side computer system on the selected carrier network. As an example, the limited access request may be provided responsive to the selection of the carrier network. The limited access request may comprise the stored access information that allows the user device to obtain carrier-specific parameters for configuring the user device via the selected carrier network. Operation 306 may be performed by an access subsystem that is the same as or similar to access subsystem 202, in accordance with one or more embodiments.

In an operation 308, responsive to the limited access being granted (e.g., by the carrier-side computer system), a configuration package (comprising one or more carrier-specific parameters for configuring the user device for the selected carrier network) may be obtained from the carrier-side computer system. Operation 308 may be performed by an configuration subsystem that is the same as or similar to configuration subsystem 204, in accordance with one or more embodiments.

In an operation 310, the user device may be configured based on the obtained configuration package for further access to the selected carrier network. Operation 310 may be performed by an configuration subsystem that is the same as or similar to configuration subsystem 204, in accordance with one or more embodiments.

Figure 4:
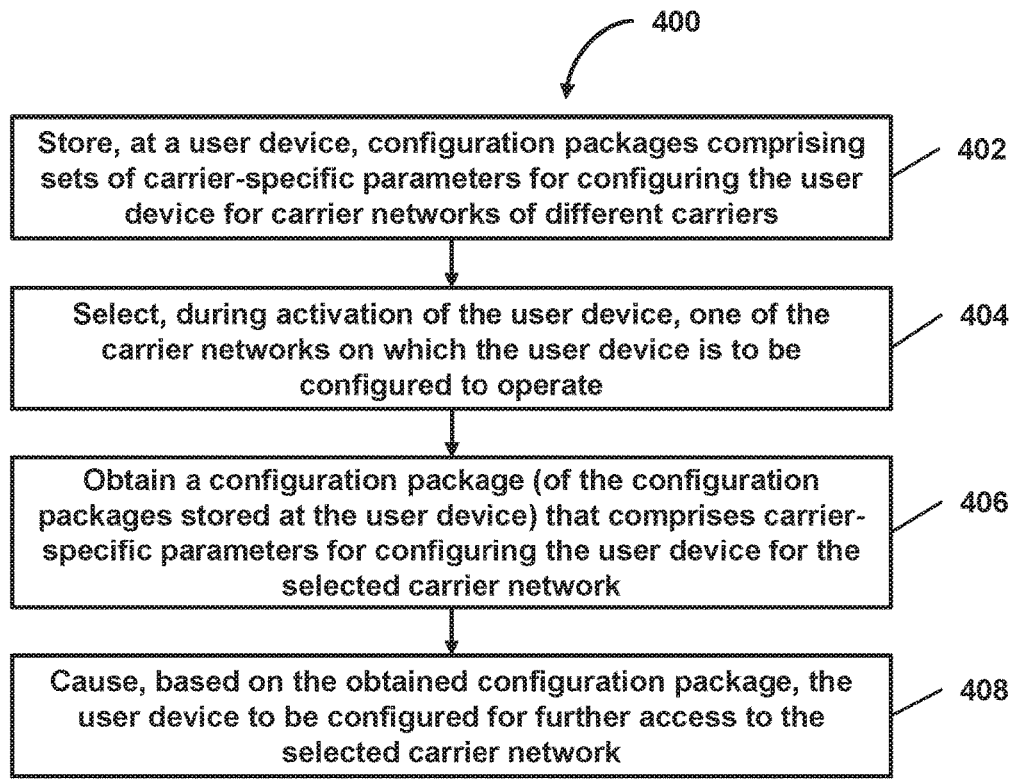
FIG. 4 shows a flowchart of a method of facilitating carrier-specific configuration of a user device based on pre-stored configuration packages for multiple carriers, in accordance with one or more embodiments.

FIG. 4 shows a flowchart of a method 400 of facilitating carrier-specific configuration of a user device based on pre-stored configuration packages for multiple carriers, in accordance with one or more embodiments.

In an operation 402, configuration packages (comprising sets of carrier-specific parameters for configuring the user device for carrier networks of different carriers) may be stored. As an example, the sets of carrier-specific parameters may comprise a set of carrier-specific parameters of a configuration package for configuring the user device for a carrier network of a first carrier, a set of carrier-specific parameters of a configuration package for configuring the user device for a carrier network of a second carrier, and so on. Operation 402 may be performed by a user device storage subsystem that is the same as or similar to user device storage subsystem 206, in accordance with one or more embodiments.

In an operation 404, one of the carrier networks (on which the user device is to be configured to operate) may be selected during activation of the user device. Operation 404 may be performed by a configuration subsystem that is the same as or similar to configuration subsystem 204, in accordance with one or more embodiments.

In an operation 406, a configuration package (of the configuration packages stored at the user device) comprising one or more carrier-specific parameters (for configuring the user device for the selected carrier network) may be obtained. Operation 406 may be performed by a configuration subsystem that is the same as or similar to configuration subsystem 204, in accordance with one or more embodiments.

In an operation 408, the user device may be configured based on the obtained configuration package for further access to the selected carrier network. Operation 408 may be performed by a configuration subsystem that is the same as or similar to configuration subsystem 204, in accordance with one or more embodiments.

Figure 5:
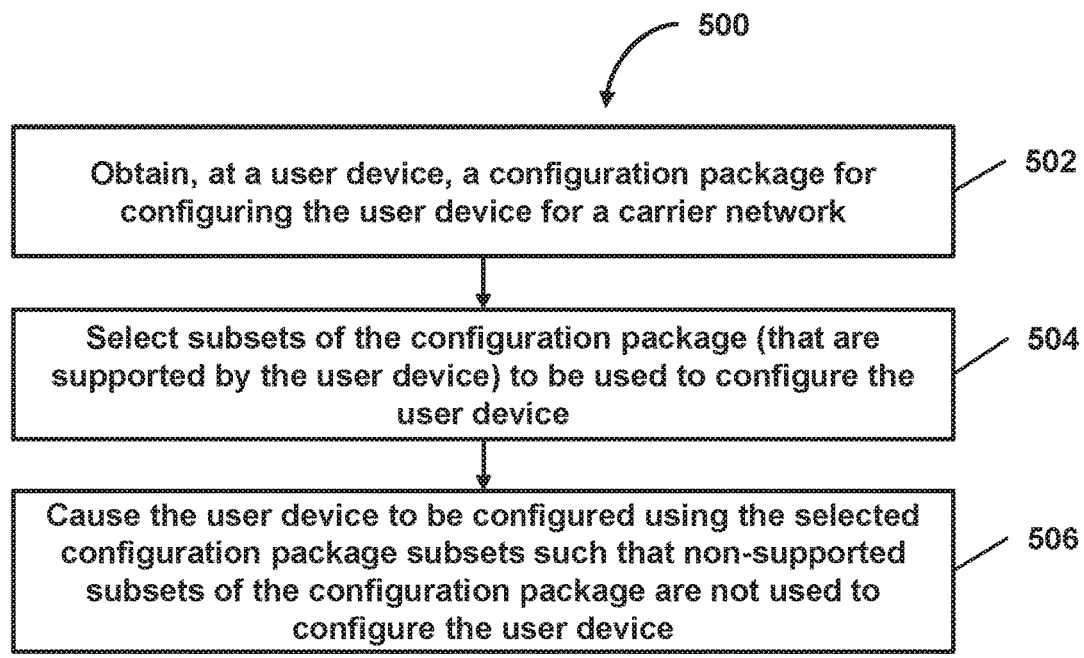
FIG. 5 shows a flowchart of a method of facilitating configuration of a user device using a configuration package based on user device assessment of the configuration package, in accordance with one or more embodiments.

FIG. 5 shows a flowchart of a method 500 of facilitating configuration of a user device using a configuration package based on user device assessment of the configuration package, in accordance with one or more embodiments.

In an operation 502, a configuration package for configuring a user device for a carrier network may be obtained at the user device. The configuration package may, for example, comprise one or more carrier-specific parameters for configuring the user device for the selected carrier network. As an example, a set of configuration packages associated with carrier networks of different carriers may be pre-stored at the user device (e.g., where each configuration package may comprise one or more carrier-specific parameters for configuring the user device for a carrier network), and the configuration package may be obtained from the configuration packages pre-stored at the user device responsive to selection of the carrier network as a carrier network on which the user device is to operate. As another example, a configuration request may be provided from the user device to a carrier-side computer system, a third party computer system (e.g., with respect to the carrier), or other computer system to obtain the configuration package (comprising the carrier-specific parameters for configuring the user device for the carrier network) from the carrier-side computer system, the third party computer system, or other computer system. Operation 502 may be performed by a configuration subsystem that is the same as or similar to configuration subsystem 204, in accordance with one or more embodiments.

In an operation 504, subsets of the obtained configuration package (that are supported by the user device) to be used to configure the user device may be selected. Operation 504 may be performed by a configuration subsystem that is the same as or similar to configuration subsystem 204, in accordance with one or more embodiments.

In an operation 506, the user device may be configured using the selected configuration package subsets such that non-supported subsets of the obtained configuration package are not used to configure the user device. Operation 506 may be performed by a configuration subsystem that is the same as or similar to configuration subsystem 204, in accordance with one or more embodiments.

Figure 6:
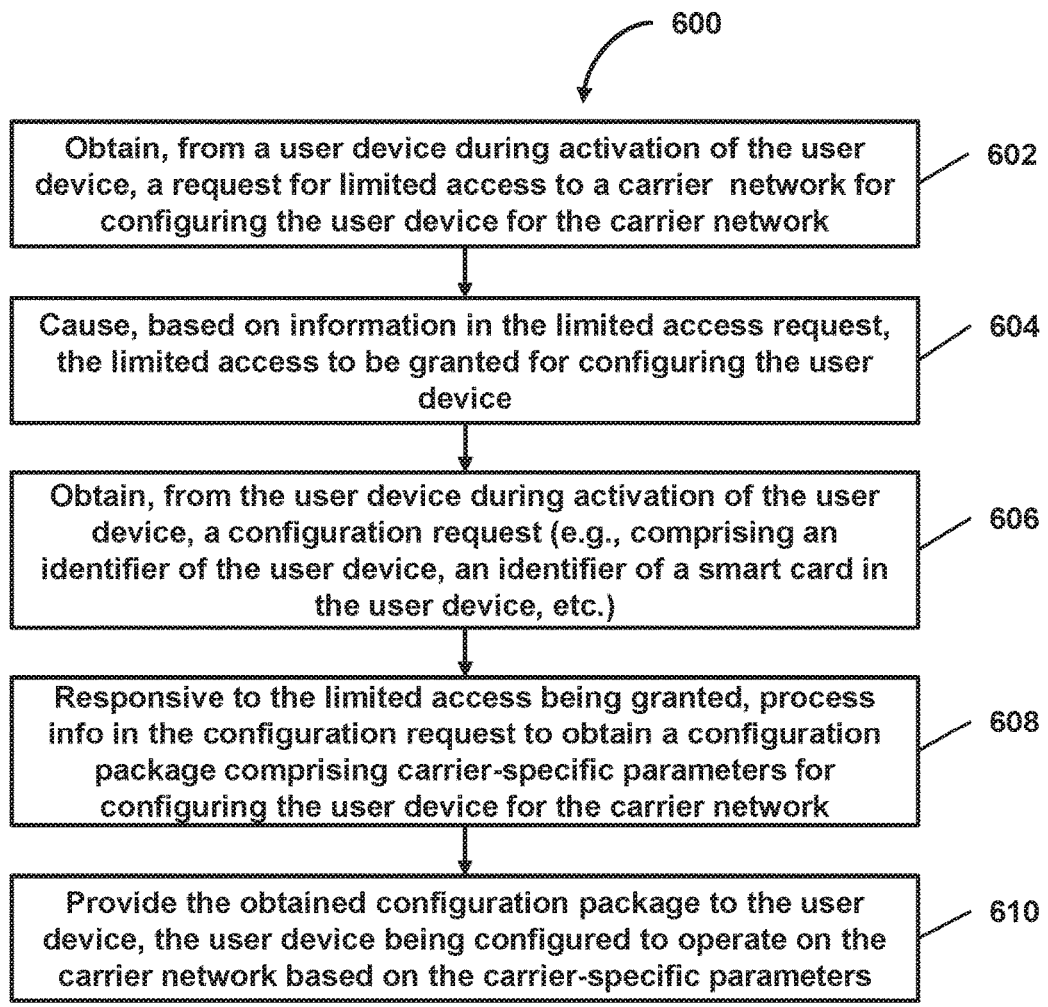
FIG. 6 shows a flowchart of a method of facilitating carrier-specific configuration of a user device based on pre-stored limited access information, in accordance with one or more embodiments.

FIG. 6 shows a flowchart of a method 600 of facilitating carrier-specific configuration of a user device based on pre-stored limited access information, in accordance with one or more embodiments.

In an operation 602, a request for limited access to a carrier network of the carrier for configuring the user device for the carrier network may be obtained from a user device during activation of the user device. As an example, the limited access request may comprise access information that allows the user device to obtain carrier-specific parameters for configuring the user device via the carrier network. Operation 602 may be performed by an access management subsystem that is the same as or similar to access management subsystem 112, in accordance with one or more embodiments.

In an operation 604, the limited access may be caused to be granted (for configuring the user device) based on information in the limited access request. As an example, the limited access may be granted to the user device responsive to validation of the access information (that allows the user device to obtain carrier-specific parameters from the carrier network) in the limited access request. Operation 604 may be performed by an access management subsystem that is the same as or similar to access management subsystem 112, in accordance with one or more embodiments.

In an operation 606, a configuration request may be obtained from the user device during activation of the user device. As an example, the configuration request may comprise an identifier for the user device, an identifier for an smart card in the user device, or other information. Operation 606 may be performed by an activation management subsystem that is the same as or similar to activation management subsystem 114, in accordance with one or more embodiments.

In an operation 608, information in the configuration request may be processed (responsive to the limited access being granted) to obtain a configuration package comprising one or more carrier-specific parameters for configuring the user device for the carrier network. Operation 608 may be performed by a configuration package management subsystem that is the same as or similar to configuration package management subsystem 116, in accordance with one or more embodiments.

In an operation 610, the obtained configuration package may be provided to the user device. The user device may be configured to operate on the carrier network based on the carrier-specific parameters of the provided configuration package. Operation 610 may be performed by a configuration package management subsystem that is the same as or similar to configuration package management subsystem 116, in accordance with one or more embodiments.

Figure 7A:
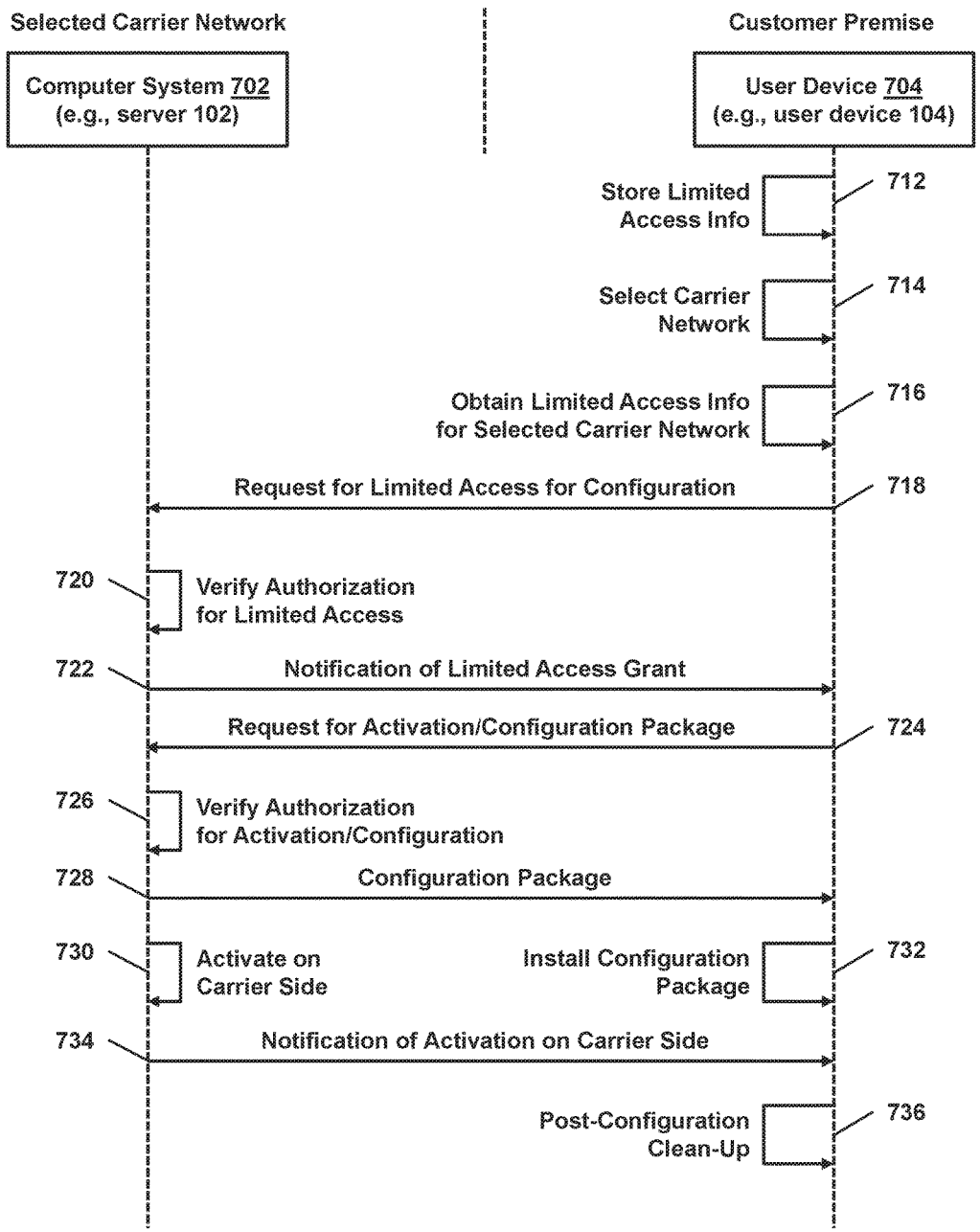
FIGS. 7A-7C show dataflow diagrams related to facilitating carrier-specific configuration of a user device, in accordance with one or more embodiments.
Figure 7B:
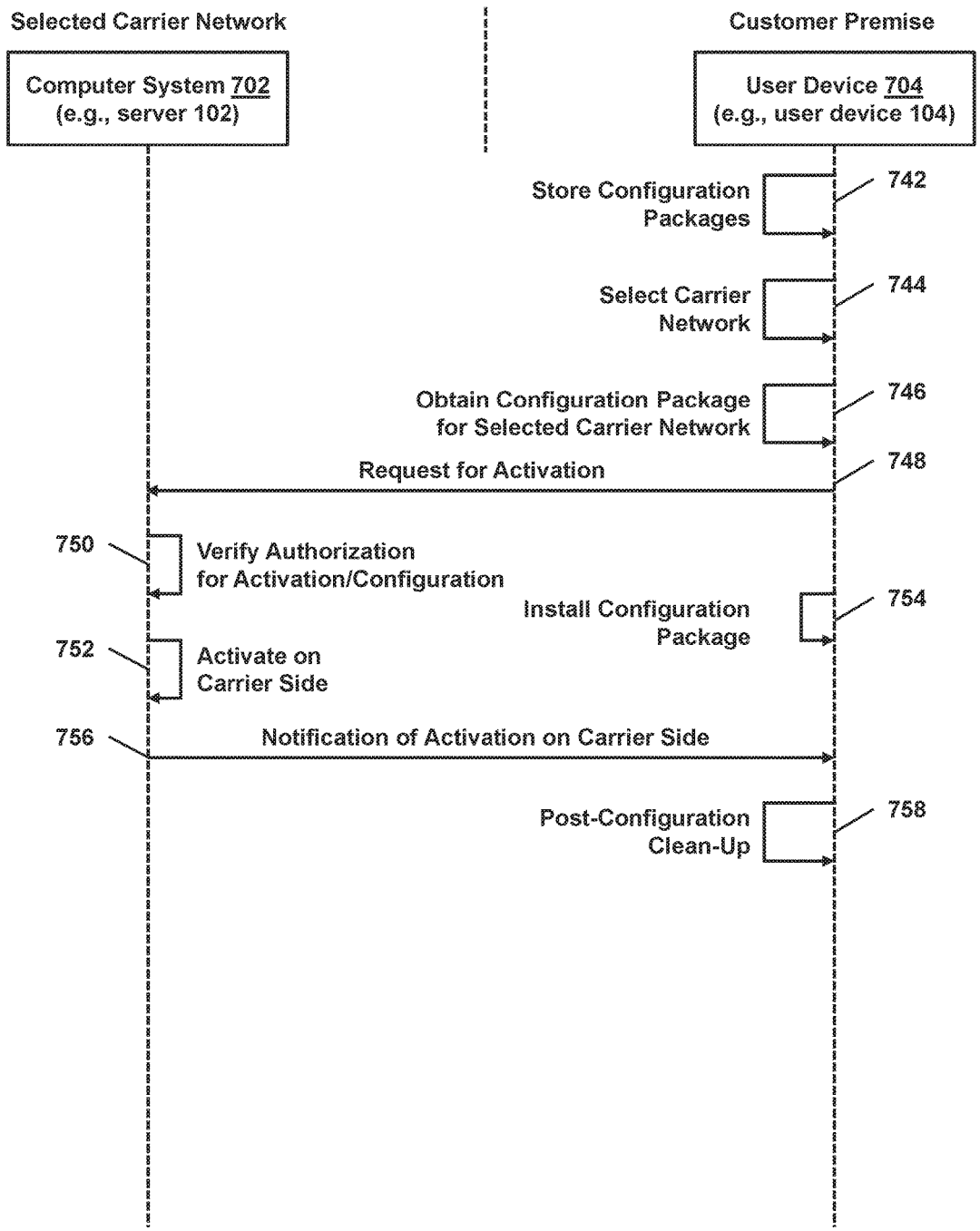
Figure 7C:
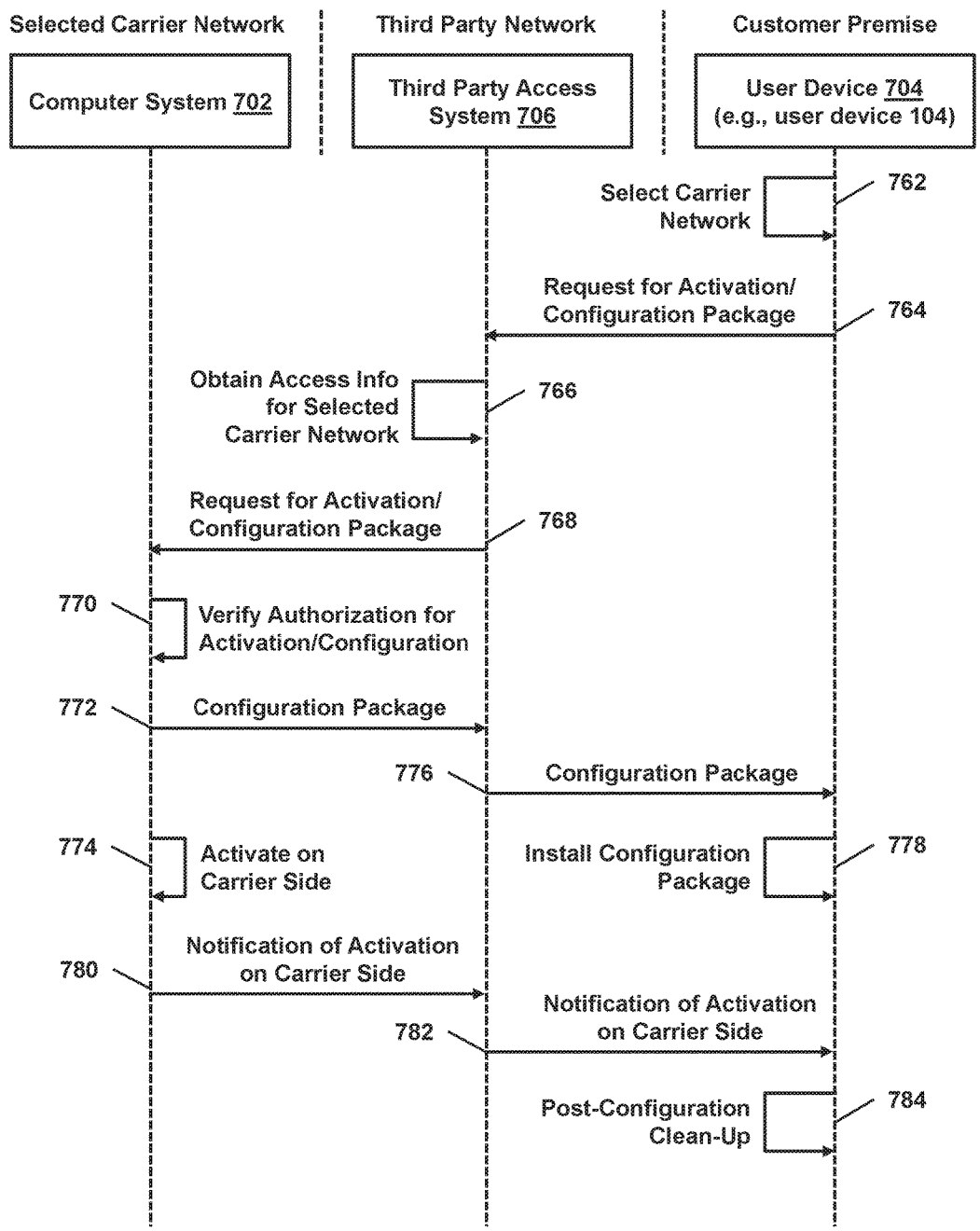

FIGS. 7A-7C comprise example dataflow diagrams related to operations that enable the various features and functionality of the system as described in detail above. The related operations presented below are intended to be illustrative and non-limiting. In some embodiments, for example, one or more additional operations not described may be performed, and/or one or more of the operations discussed may not be performed. Additionally, the order in which the related operations are illustrated (and described below) is not intended to be limiting.

FIG. 7A shows a dataflow diagram related to facilitating carrier-specific configuration of a user device based on pre-stored limited access information, in accordance with one or more embodiments. As an example, computer system 702 may be a computer system of a selected carrier network, and user device 704 may be a user device at a customer premise.

In an embodiment, at 712, limited access information for accessing computer systems of multiple carrier networks may be stored at user device 704. As an example, in one use case, the stored limited access information may comprise information for limited access that allows the user device 704 to obtain carrier-specific parameters for configuring the user device 704 from carrier networks of different carriers. In another use case, the limited access information may be pre-stored on user device 704 by a manufacturer (e.g., during the manufacturing processing, prior to delivery of user device 704 to a carrier, prior to delivery of user device 704 to a user, etc.).

At 714, a carrier network (on which user device is to be used) may be selected at user device 704. At 716, responsive to selection of the carrier network, limited access information for the selected carrier network may be obtained by user device 104 from storage.

At 718, a request for limited access for configuration may be generated at user device 704 and provided to computer system 702. The limited access request may, for example, be generated to comprise the limited access information for the selected carrier network (that was pre-stored and obtained by user device 704 from storage responsive to selection of the carrier network).

At 720, responsive to obtaining the limited access request, authorization for user device 704 to have limited access to the selected carrier network may be verified at computer system 702.

At 722, if the authorization for user device 704 to have limited access to the selected carrier network is verified, a notification of the limited access grant may be generated at computer system 702 and provided to user device 704.

At 724, a request for activation and/or for a configuration package may be generated at user device 704 and provided to computer system 702.

At 726, responsive to obtaining the activation/configuration request, authorization for the activation and/or the configuration package may be verified at computer system 702.

At 728 and 730, if the authorization for the activation and/or the configuration package is verified, the configuration package may be obtained at computer system 702 and provided to user device 704, and user device 704 may be activated on the carrier side at computer system 702. At 732, responsive to obtaining the configuration package, the configuration package may be installed at user device 704. At 734, a notification of the activation on the carrier side may be generated at computer system 702 and provided to user device 704.

At 736, post-configuration clean-up may be performed at user device 704. As an example, at least part of the limited access information may be caused to be deleted from user device 704. In one use case, for example, responsive to user device 704 being configured for the selected carrier network, (i) the limited access information that allows user device 704 to obtain carrier-specific parameters for configuring user device 704 via one or more carrier networks other than the selected carrier network, (ii) the limited access information that allows user device 704 to obtain carrier-specific parameters for configuring user device 704 via the selected carrier network, or (iii) both may be deleted. As another example, responsive to user device 704 being configured for the selected carrier network, the configuration package obtained from computer system 704 may be deleted.

FIG. 7B shows a dataflow diagram related to facilitating carrier-specific configuration of a user device based on pre-stored configuration information, in accordance with one or more embodiments. In an embodiment, at 742, configuration packages may be stored at user device 704. As an example, the configuration packages may comprise sets of carrier-specific parameters for configuring user device 704 for carrier networks of different carriers. In one scenario, the sets of carrier-specific parameters may comprise a set of carrier-specific parameters of a configuration package for configuring the user device for a carrier network of a first carrier, a set of carrier-specific parameters of a configuration package for configuring the user device for a carrier network of a second carrier, and so on. In another scenario, the configuration packages may be pre-stored on user device 704 by a manufacturer (e.g., during the manufacturing processing, prior to delivery of user device 704 to a carrier, prior to delivery of user device 704 to a user, etc.).

At 744, a carrier network (on which user device 704 is to be used) may be selected at user device 704. At 746, responsive to selection of the carrier network, a configuration package for the selected carrier network may be obtained by user device 704 from storage.

At 748, a request for activation may be generated at user device 704 and provided to computer system 702. At 750, responsive to obtaining the activation request, authorization for the activation may be verified at computer system 702.

At 752, if the authorization for the activation is verified, user device 704 may be activated on the carrier side at computer system 702. At 754, the configuration package (for the selected carrier network) may be installed at user device 704 (e.g., prior to, in parallel with, or after the generation of the activation request). At 756, a notification of the activation on the carrier side may be generated at computer system 702 and provided to user device 704.

At 758, post-configuration clean-up may be performed at user device 704. As an example, one or more of the configuration packages stored at user device 704 may be caused to be deleted from user device 704. In one use case, for example, responsive to user device 704 being configured for the selected carrier network, (i) the configuration package comprising a set of carrier-specific parameters for configuring user device 704 for the selected carrier network, (ii) one or more other configuration packages comprising one or more other set of carrier-specific parameters for configuring user device 704 for one or more other carrier networks, or (iii) both may be deleted.

FIG. 7C shows a dataflow diagram related to facilitating carrier-specific configuration of a user device using a third party access system, in accordance with one or more embodiments. In an embodiment, at 762, a carrier network (on which user device 704 is to be used) may be selected at user device 704. At 764, responsive to selection of the carrier network, a request for activation and/or for a configuration package may be generated at user device 704 and provided to third party access system 706.

At 766, access information for the selected network may be obtained at third party access system 706 and utilized to provide (at 768) the request for activation of user device 704 and/or for a configuration package for user device 704 to computer system 702 (at the selected carrier network). As an example, the obtained access information may comprise a username, a password, an access token, a network identifier for an access point (on the selected carrier network for activating user devices or obtaining configuration information), a network address associated with such access point, or other information.

At 770, responsive to obtaining the activation/configuration request, authorization for the activation and/or the configuration package may be verified at computer system 702.

At 772, 774, and 776, if the authorization for the activation and/or the configuration package is verified, the configuration package may be obtained at computer system 702 and provided to third party access system 706, the configuration package may be obtained at third party access system 706 and provided to user device 704, and user device 704 may be activated on the carrier side at computer system 702. At 778, responsive to obtaining the configuration package, the configuration package may be installed at user device 704. At 780 and 782, a notification of the activation on the carrier side may be generated at computer system 702 and provided to third party access system 706, and the notification may be obtained at third party access system 706 and provided to user device 704.

At 784, post-configuration clean-up may be performed at user device 704. For example, one or more post-configuration clean-up operations described herein or other operations may be performed.

In some embodiments, the various computers and subsystems illustrated in FIG. 1 may comprise one or more computing devices that are programmed to perform the functions described herein. The computing devices may include one or more electronic storages (e.g., carrier access database 132, configuration database 134, or other electric storages), one or more physical processors programmed with one or more computer program instructions, and/or other components. The computing devices may include communication lines or ports to enable the exchange of information with a network (e.g., network 150) or other computing platforms via wired or wireless techniques (e.g., Ethernet, fiber optics, coaxial cable, WiFi, Bluetooth, near field communication, or other technologies). The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-118, subsystems 202-208, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-118 or 202-208 described herein is for illustrative purposes, and is not intended to be limiting, as any of subsystems 112-118 or 202-208 may provide more or less functionality than is described. For example, one or more of subsystems 112-118 or 202-208 may be eliminated, and some or all of its functionality may be provided by other ones of subsystems 112-118 or 202-208. As another example, additional subsystems may be programmed to perform some or all of the functionality attributed herein to one of subsystems 112-118 or 202-208.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

What is claimed is:

1. A system for facilitating carrier-specific configuration of user devices, the system comprising a user device that includes one or more physical processors programmed to execute computer program instructions which, when executed, cause the user device to:

store configuration packages comprising sets of carrier-specific parameters for configuring the user device for carrier networks of different carriers, wherein the sets of carrier-specific parameters comprise a set of carrier-specific parameters of one configuration package for configuring the user device for a carrier network of one carrier and a set of carrier-specific parameters of another configuration package for configuring the user device for a carrier network of another carrier;

select, during activation of the user device, one of the carrier networks on which the user device is to be configured to operate;

responsive to the selection of the carrier network, determine whether the stored configuration packages comprise a configuration package that comprises one or more carrier-specific parameters for configuring the user device for the selected carrier network;

responsive to the determination that the stored configuration packages comprise the configuration package that comprises the one or more carrier-specific parameters for configuring the user device for the selected carrier network, cause the user device to be configured for further access to the selected carrier network based on the configuration package that comprises the one or more carrier-specific parameters for configuring the user device for the selected carrier network; and responsive to the determination that the stored configuration packages do not comprise the configuration package that comprises the one or more carrier-specific parameters for configuring the user device for the selected carrier network, provide, to a carrier-side computer system on the selected carrier network, a request for limited access to the selected carrier network for configuring the user device for the selected carrier network, wherein the limited access request comprises a multi-carrier-recognized access point name that is recognized by the carrier networks of the different carriers for obtaining carrier-specific parameters for configuring the user device via the carrier networks of the different carriers.

2. The system of claim 1, wherein the user device is caused to:

responsive to configuring the user device for further access to the selected network carrier, cause one or more of the stored configuration packages that do not comprise the one or more carrier-specific parameters for configuring the user device for the selected carrier network to be deleted from the user device.

3. The system of claim 1, wherein the user device is caused to:

responsive to configuring the user device for further access to the selected network carrier, cause the configuration package that comprises the one or more carrier-specific parameters for configuring the user device for the selected carrier network to be deleted from the user device.

4. The system of claim 1, wherein the user device is caused to:

responsive to configuring the user device for further access to the selected network carrier, provide an activation request to the carrier-side computer system on the selected carrier network, wherein the activation request comprises at least one of an identifier for the user device or an identifier for a smart card in the user device.

5. The system of claim 1, wherein causing the user device to be configured for further access to the selected carrier network comprises:
selecting, based on a location associated with the user device, at least one of the one or more carrier-specific parameters to be applied to configure the user device; and
responsive to the selection of the at least one carrier-specific parameter, causing the user device to be configured using the selected at least one carrier-specific parameter.

6. The system of claim 1, wherein causing the user device to be configured for further access to the selected carrier network comprises:
selecting one or more subsets of a package that are supported by the user device to be used to configure the user device; and
responsive to the selection of the one or more package subsets, causing the user device to be configured using the selected one or more package subsets such that one or more subsets of the package that are not supported by the user device are not used to configure the user device, the package corresponding to the configuration package comprising the one or more carrier-specific parameters for configuring the user device for the selected carrier network.

7. The system of claim 1, further comprising:
responsive to the limited access being granted by the carrier-side computer system, obtain, from the carrier-side computer system, the configuration package that comprises the one or more of the carrier-specific parameters for configuring the user device for the selected carrier network and cause the user device to be configured for further access to the selected carrier network based on the configuration package that comprises the one or more carrier-specific parameters for configuring the user device for the selected carrier network.

8. The system of claim 1, wherein the user device stores the configuration packages in a memory of the user device.

9. The system of claim 1, wherein the stored configuration packages are pre-stored by a manufacturer of the user device, and wherein the stored configuration packages are pre-stored by the manufacturer of the user device during a manufacturing process, prior to a delivery of the user device to a carrier, or prior to delivery of the user device to a user.

10. A method of facilitating carrier-specific configuration of user devices, the method being implemented by a user device that includes one or more physical processors programmed to execute computer program instructions which, when executed, perform the method:
storing, by the user device, configuration packages comprising sets of carrier-specific parameters for configuring the user device for carrier networks of different carriers, wherein the sets of carrier-specific parameters comprise a set of carrier-specific parameters of one configuration package for configuring the user device for a carrier network of one carrier and a set of carrier-specific parameters of another configuration package for configuring the user device for a carrier network of another carrier;
selecting, by the user device, during activation of the user device, one of the carrier networks on which the user device is to be configured to operate;
responsive to the selection of the carrier network, determining whether the stored configuration packages comprise a configuration package that comprises one or more carrier-specific parameters for configuring the user device for the selected carrier network;
responsive to the determination that the stored configuration packages comprise the configuration package that comprises the one or more carrier-specific parameters for configuring the user device for the selected carrier network, causing, by the user device, the user device to be configured for further access to the selected carrier network based on the configuration package that comprises the one or more carrier-specific parameters for configuring the user device for the selected carrier network; and
responsive to the determination that the stored configuration packages do not comprise the configuration package that comprises the one or more carrier-specific parameters for configuring the user device for the selected carrier network, providing, to a carrier-side computer system on the selected carrier network, a request for limited access to the selected carrier network for configuring the user device for the selected carrier network,
wherein the limited access request comprises a multi-carrier-recognized access point name that is recognized by the carrier networks of the different carriers for obtaining carrier-specific parameters for configuring the user device via the carrier networks of the different carriers.

11. The method of claim 10, further comprising:
responsive to configuring the user device for further access to the selected network carrier, causing, by the user device, one or more of the stored configuration packages that do not comprise the one or more carrier-specific parameters for configuring the user device for the selected carrier network to be deleted from the user device.

12. The method of claim 10, further comprising:
responsive to configuring the user device for further access to the selected network carrier, causing, by the user device, the configuration package that comprises the one or more carrier-specific parameters for configuring the user device for the selected carrier network to be deleted from the user device.

13. The method of claim 10, wherein causing the user device to be configured for further access to the selected carrier network comprises:
selecting, based on a location associated with the user device, at least one of the one or more carrier-specific parameters to be applied to configure the user device; and
responsive to the selection of the at least one carrier-specific parameter, causing the user device to be configured using the selected at least one carrier-specific parameter.

14. The method of claim 10, wherein causing the user device to be configured for further access to the selected carrier network comprises:
selecting one or more subsets of a package that are supported by the user device to be used to configure the user device; and
responsive to the selection of the one or more package subsets, causing the user device to be configured using the selected one or more package subsets such that one or more subsets of the package that are not supported by the user device are not used to configure the user device, the package corresponding to the configuration package comprising the one or more carrier-specific parameters for configuring the user device for the selected carrier network.

15. The method of claim 10, further comprising:
responsive to configuring the user device for further access to the selected network carrier, providing an activation request to the carrier-side computer system on the selected carrier network, wherein the activation request comprises at least one of an identifier for the user device or an identifier for a smart card in the user device.

16. The method of claim 10, further comprising:
responsive to the limited access being granted by the carrier-side computer system, obtaining, from the carrier-side computer system, the configuration package that comprises the one or more of the carrier-specific parameters for configuring the user device for the selected carrier network and causing the user device to be configured for further access to the selected carrier network based on the configuration package that comprises the one or more carrier-specific parameters for configuring the user device for the selected carrier network.

17. The method of claim 10, wherein the user device stores the configuration packages in a memory of the user device.

18. The method of claim 10, wherein the stored configuration packages are pre-stored by a manufacturer of the user device, and wherein the stored configuration packages are pre-stored by the manufacturer of the user device during a manufacturing process, prior to a delivery of the user device to a carrier, or prior to delivery of the user device to a user.

* * * * *